(12) United States Patent
Cromer et al.

(10) Patent No.: US 11,008,453 B2
(45) Date of Patent: May 18, 2021

(54) POLYMERIC COMPOSITE ARTICLES COMPRISING THE HETEROGENEOUS SURFACE/BULK DISTRIBUTION OF DISCRETE PHASE

(71) Applicant: Arkema France, Colombes (FR)

(72) Inventors: Brian M. Cromer, Wayne, PA (US); Robert John Barsotti, Newtown Square, PA (US); Samuel Schulte, Spring City, PA (US)

(73) Assignee: Arkema France, Colombes (FR)

( * ) Notice: Subject to any disclaimer, the term of this patent is extended or adjusted under 35 U.S.C. 154(b) by 31 days.

(21) Appl. No.: 16/247,635

(22) Filed: Jan. 15, 2019

(65) Prior Publication Data
US 2019/0218385 A1 Jul. 18, 2019

Related U.S. Application Data

(60) Provisional application No. 62/617,749, filed on Jan. 16, 2018.

(51) Int. Cl.
| | | |
|---|---|---|
| C08L 33/12 | (2006.01) | |
| C08K 3/36 | (2006.01) | |
| C08K 3/013 | (2018.01) | |
| C08K 3/22 | (2006.01) | |
| C08L 23/02 | (2006.01) | |
| C08L 25/12 | (2006.01) | |
| C08L 27/06 | (2006.01) | |
| C08L 55/02 | (2006.01) | |
| C08L 69/00 | (2006.01) | |
| C08L 71/02 | (2006.01) | |
| C08L 75/04 | (2006.01) | |
| C08L 77/00 | (2006.01) | |
| C08K 3/04 | (2006.01) | |
| C08L 33/04 | (2006.01) | |
| C08L 83/04 | (2006.01) | |

(52) U.S. Cl.
CPC ............ *C08L 33/12* (2013.01); *C08K 3/013* (2018.01); *C08K 3/22* (2013.01); *C08K 3/36* (2013.01); *C08L 23/02* (2013.01); *C08L 25/12* (2013.01); *C08L 27/06* (2013.01); *C08L 55/02* (2013.01); *C08L 69/00* (2013.01); *C08L 71/02* (2013.01); *C08L 75/04* (2013.01); *C08L 77/00* (2013.01); *C08K 3/04* (2013.01); *C08K 2003/2296* (2013.01); *C08K 2201/005* (2013.01); *C08L 33/04* (2013.01); *C08L 83/04* (2013.01); *C08L 2203/30* (2013.01); *C08L 2205/22* (2013.01); *C08L 2207/53* (2013.01)

(58) Field of Classification Search
CPC ........................................... B29C 2045/0015
See application file for complete search history.

(56) References Cited

U.S. PATENT DOCUMENTS

| | | | | |
|---|---|---|---|---|
| 5,800,910 | A | | 9/1998 | Harke et al. |
| 5,820,808 | A | * | 10/1998 | van Oene ........... B29C 45/0013 264/328.12 |
| 5,962,563 | A | * | 10/1999 | Forrestal ................ B29C 33/38 264/331.12 |
| 6,087,430 | A | * | 7/2000 | Sterling ............... C08L 101/00 524/366 |
| 6,387,519 | B1 | | 5/2002 | Anderson et al. |
| 7,679,036 | B2 | | 3/2010 | Feigenblum et al. |
| 8,657,595 | B2 | | 2/2014 | Feigenblum et al. |
| 8,794,950 | B2 | | 8/2014 | Feigenblum et al. |
| 8,926,887 | B2 | | 1/2015 | Guichard et al. |
| 9,061,445 | B2 | | 6/2015 | Hinzpeter |
| 9,248,598 | B2 | | 2/2016 | Guichard et al. |
| 9,579,828 | B2 | | 2/2017 | Guichard et al. |
| 9,862,132 | B2 | | 1/2018 | Feigenblum et al. |
| 10,052,803 | B2 | | 8/2018 | Guichard et al. |
| 10,173,379 | B2 | | 1/2019 | Feigenblum et al. |
| 2003/0106294 | A1 | * | 6/2003 | Chung ................. B01D 39/086 55/486 |
| 2003/0165710 | A1 | | 9/2003 | Kuramoto et al. |
| 2009/0017294 | A1 | * | 1/2009 | Poole ................... C09D 5/4488 428/339 |
| 2011/0098394 | A1 | * | 4/2011 | Schmeltzer .......... C08G 18/792 524/413 |
| 2011/0153029 | A1 | * | 6/2011 | Colardelle Mano .... A61L 27/56 623/23.61 |
| 2013/0202869 | A1 | | 8/2013 | Cho et al. |
| 2018/0366241 | A1 | * | 12/2018 | Iida ......................... H01B 3/10 |

FOREIGN PATENT DOCUMENTS

| | | | |
|---|---|---|---|
| EP | 972 809 A2 | * | 1/2000 |
| WO | WO 2016/093159 A1 | * | 6/2016 |
| WO | WO 2017/104032 | * | 1/2017 |
| WO | WO 2018/132818 A2 | | 7/2018 |

OTHER PUBLICATIONS

Anisotropic Shape Memory Behaviors of Polylactic Acid/Citric Acid-Bentonite Composite with a Gradient Filler Concentration in Thickness Direction authored by Fu et al. and published in Industrial & Engineering Chemistry Research (2018) 57, 6265-6274.*

* cited by examiner

*Primary Examiner* — Marc S Zimmer
(74) *Attorney, Agent, or Firm* — Thomas F. Roland

(57) ABSTRACT

The invention relates to a thermoplastic article having a continuous polymeric phase and a discontinuous discrete phase distributed within the continuous phase. The discontinuous phase may be inorganic materials or an organic phase. The volume fraction of the discrete phase at the surface of the article is plus or minus 15% of the concentration of the additive as compared to the concentration of the additive in the bulk of the material (>20 micrometers). The invention also relates an article where the discrete additive forms domains in the surface region—potentially beneficial for gloss reduction or electrical conductivity. The invention finally relates to a process for forming a thermoplastic article with surface additive enhancement, with inclusion of inductive heating of one or more surfaces of the mold to induce the unique distribution.

9 Claims, No Drawings

POLYMERIC COMPOSITE ARTICLES COMPRISING THE HETEROGENEOUS SURFACE/BULK DISTRIBUTION OF DISCRETE PHASE

CROSS REFERENCE TO RELATED APPLICATIONS

This application claims benefit, of U.S. Provisional Application No. 62/617,749, filed Jan. 16, 2019, incorporated herein by reference.

FIELD OF THE INVENTION

The invention relates to a thermoplastic article having a continuous polymeric phase and a discontinuous discrete phase distributed within the continuous phase. The discontinuous phase may be comprised of inorganic materials, preferably metal oxides or an organic phase such as core shell or block copolymer impact modifiers. The article is unique in its distribution of the discontinuous phase in that the volume fraction of discrete phase at the surface of the article (within 20 micrometers of the surface) is substantially less or greater (±15% of the concentration of the additive) as compared to the concentration of the additive in the bulk of the material (>20 micrometers). This surface enhancement may be beneficial to surface properties of the material such as scratch or mar resistance, resistance to ultraviolet radiation, or hardness without adversely effecting bulk properties such as ductility, modulus or thermal resistance. The invention also relates an article where the discrete additive forms domains in the surface region—potentially beneficial for gloss reduction or electrical conductivity. The invention finally relates to a process for forming a thermoplastic article with surface additive enhancement, depletion or domain formation utilizing melt process such as injection or compression molding with inclusion of inductive heating of 1 or more surfaces of the mold to induce the unique distribution.

BACKGROUND OF THE INVENTION

For use in many applications, polymeric articles are often required to maintain a balance of certain properties—some properties which are dominated by surface characteristics, other which are more defined by the bulk of the material. The use of discrete additive phases in polymer formulations, allows for the altering of properties. Unfortunately, in most polymeric articles, the surface of the material has a very similar composition to the bulk. The discrete phase additive may enhance a property needed at the surface but diminish a property needed in the bulk (or vice versa). For instance, adding inorganic particles to a polymer may increase its surface hardness but does so while sacrificing the bulk ductility or impact resistance.

Differing surface characteristics can be achieved via multi-layer structures or articles. Unfortunately this typically requires additional complexity in manufacturing—added or different tooling (such a multilayer dies for coextrusion) or additional time (multi shot injection molding). Multilayer materials also by definition have an interface—which in many cases in the source of defects.

In many cases, it may also be advantageous for additives to form large domains in the surface region—to achieve properties such as gloss reduction or reduce surface resistivity.

There is a need for an easier and less expensive solution to provide thermoplastic articles with differing surface and bulk composition or larger domains. It is also desired to find a process that can produce these articles using typical tooling with typical production cycle times.

It has surprisingly been found that a structure can be created with a surface composition that differs in the concentration or domain size of the discrete phase from the bulk phase. Processes have been identified that allow for this structure to be formed utilizing injection or compression molding—optionally using inductive heating on one or more sides of the mold.

SUMMARY OF THE INVENTION

The invention comprises a thermoplastic article having a continuous polymeric phase (matrix) and a discontinuous discrete phase (additive) distributed within the continuous phase where the surface concentration of the discrete additive is increased from the bulk concentration by at least 15 volume percent of the concentration of the additive, more preferably at least 20 volume percent of the concentration of the additive. The invention also relates an article where the additive forms larger domains in the surface region—potentially beneficial for gloss reduction or decreased electrical resistivity. The invention finally relates to a processes for forming a thermoplastic article with surface additive enhancement, depletion or domain formation utilizing melt process such as injection or compression molding with inclusion of inductive heating of 1 or more surfaces of the mold to induce the unique distribution. Multi-layer article where-in one a layer comprises the surface enhanced or flocculated discrete phase are also a part of the invention.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A thermoplastic article having a continuous polymeric phase (matrix) and a discontinuous discrete phase additive distributed within the continuous phase where the surface concentration of the discrete additive is greater or less than the bulk concentration by at least 15 volume percent of the concentration of the additive, more preferably at least 20 volume percent of the concentration of the additive.

2. The thermoplastic article of aspect 1, wherein said matrix is selected from the group consisting of acrylic polymers, styrenic polymers, acrylonitrile-butadiene-styrene (ABS) copolymers, acrylonitrile-styrene-acrylate (ASA) copolymers, styrene acrylonitrile (SAN) copolymers, polyolefins, polyvinyl chloride (PVC), polycarbonate (PC), polyurethane (PU), polyamides (PA), polypropylene oxide (PPO), polyesters, thermoplastic fluoropolymers or mixtures thereof.

3. The thermoplastic article of any of aspects 1 and 2, wherein said discrete phase additive comprises an impact modifier, selected from the group consisting of block copolymers, graft copolymers, and core/shell impact modifiers.

4. The thermoplastic article of any of aspects 1 to 3, wherein said discrete phase additive comprises a mineral oxide or nano-mineral oxide.

5. The thermoplastic article of any of aspects 1 to 4, wherein said discrete phase additive comprises a pigment, a thermally conductive additive, or electrically conductive additive selected from the group consisting of carbon black, nano-carbon, graphite oxide, reduced graphite oxide, graphene, nanographite, and graphite nanoplatelet.

6. The thermoplastic article of any of aspects 1 to 5 wherein said discrete phase additive comprises a cross-linked acrylic bead, cross-linked polyorganosilicone rubber, or polymethylsilsesquioxane 7. A thermoplastic article having a continuous polymeric phase and a discontinuous discrete phase additive distributed within the continuous phase, where the additive is associated into domains, with the number average size of the domains in the thermoplastic article surface, is at least 2× the number average size of the domains in the thermoplastic article bulk.

8. The thermoplastic article of aspect 7, wherein said matrix is selected from the group consisting of acrylic polymers, styrenic polymers, acrylonitrile-butadiene-styrene (ABS) copolymers, acrylonitrile-styrene-acrylate (ASA) copolymers, styrene acrylonitrile (SAN) copolymers, polyolefins, polyvinyl chloride (PVC), polycarbonate (PC), polyurethane (PU), polyamides (PA), polypropylene oxide (PPO), polyesters, thermoplastic fluoropolymers or mixtures thereof.

9. The thermoplastic article of aspects 7 or 8, wherein said discrete phase additive is an impact modifier selected from the group consisting of block copolymers, graft copolymers, and core/shell impact modifiers.

10. The thermoplastic article of any of aspects 7 to 9, wherein said discrete phase additive comprises a mineral oxide or nano-mineral oxide.

11. The thermoplastic article of any of aspects 7 to 10, wherein said discrete phase additive comprises a pigment.

12. The thermoplastic article of any of aspects 7 to 11, wherein said discrete phase additive is a cross-linked acrylic bead, cross-linked polyorganosilicone rubber, or polymethylsilsesquioxane.

13. An injection molded thermoplastic article having a continuous polymeric phase matrix and a discontinuous discrete phase additive distributed within the continuous phase wherein the surface concentration of the additive is greater than or less than 0.5 percent of the concentration of the additive, in the bulk of the injection molded article.

14. The thermoplastic article of aspect 13, wherein said matrix is selected from the group consisting of acrylic polymers, styrenic polymers, acrylonitrile-butadiene-styrene (ABS) copolymers, acrylonitrile-styrene-acrylate (ASA) copolymers, styrene acrylonitrile (SAN) copolymers, polyolefins, polyvinyl chloride (PVC), polycarbonate (PC), polyurethane (PU), polyamides (PA), polypropylene oxide (PPO), polyesters, thermoplastic fluoropolymers or mixtures thereof.

15. The thermoplastic article of any of aspects 13 or 14, wherein said discrete phase additive comprises an impact modifier selected from the group consisting of block copolymers, graft copolymers, and core/shell impact modifiers.

16. The thermoplastic article of any of aspects 13 to 15, wherein said discrete additive comprises a mineral oxide or nano-mineral oxide such as silica or zinc oxide.

17. The thermoplastic article of any of aspects 13 to 16, wherein said discrete phase additive comprises a pigment and/or a thermally conductive and/or electrically conductive additive selected from the group consisting of carbon black, nano-carbon, graphite oxide, reduced graphite oxide, graphene, nanographite, or graphite nanoplatelet.

18. The thermoplastic article of any of aspects 13 to 17, wherein said discrete phase additive comprises a cross-linked acrylic bead, cross-linked polyorganosilicone rubber, or polymethylsilsesquioxane 19. A melt process utilizing at least one tooling surface which is heated for forming a thermoplastic article having a continuous polymeric phase (matrix) and a discontinuous discrete phase (additive) distributed within the continuous phase where the surface concentration of the discrete additive varies from the bulk concentration by at least 15 volume percent of the concentration of the additive, more preferably at least 20 volume percent of the concentration of the additive.

20. The process of aspect 19 wherein the melt process is selected from the group consisting of injection molding, extrusion and coextrusion, film extrusion, blow molding, lamination, extrusion lamination, rotomolding, and compression molding.

21. The process of any of aspects 19 or 20, wherein where one or more sides of the mold or die are inductively heated.

22. A melt process for forming a thermoplastic article having a continuous polymeric phase and a discontinuous discrete additive phase, wherein said additive is associated into domains, wherein the additive is associated into domains, with the number average size of the domains in the thermoplastic article surface, is at least 2× the number average size of the domains in the thermoplastic article bulk.

23. The melt process of aspect 22 wherein said melt process is selected from the group consisting of injection molding, extrusion and coextrusion, film extrusion, blow molding, lamination, extrusion lamination, rotomolding, and compression molding.

24. The process of any of aspects 22 or 23, wherein where one or more sides of the mold or die are inductively heated.

25. A melt process utilizing at least one tooling surface which is heated for forming a thermoplastic article having a continuous polymeric phase (matrix) and a discontinuous discrete phase (additive) distributed within the continuous phase where the surface concentration of the discrete additive is greater than or less than 0.5 percent the concentration of the additive in the bulk.

26. The process of aspect 25 where the melt process is selected from the group consisting of injection molding, extrusion and coextrusion, film extrusion, blow molding, lamination, extrusion lamination, rotomolding, and compression molding.

27. The process of any of aspects 25 or 26 where one or more sides of the mold or die are inductively heated.

28. A multi-layer article wherein a layer comprises a thermoplastic layer having a continuous polymeric phase and a discontinuous discrete additive phase distributed within the continuous phase where the surface and/or interface distribution of the discrete additive varies from the bulk distribution by at least 15 volume percent of the concentration of the additive, more preferably at least 20 volume percent of the concentration of the additive.

29. A multi-layer article wherein a layer comprises a thermoplastic layer having a continuous polymeric phase and a discontinuous discrete additive phase distributed within the continuous phase where the discrete additive forms domains, wherein said additive is associated into domains, wherein the additive is associated into domains, with the number average size of the domains in the thermoplastic article surface, is at least 2× the number average size of the domains in the thermoplastic article bulk.

DETAILED DESCRIPTION OF THE INVENTION

The invention relates to a thermoplastic article having a continuous polymeric phase (matrix) and a discontinuous discrete phase (additive) distributed within the continuous phase, where the surface distribution of the discrete additive varies from the bulk distribution by at least 15 volume percent of the concentration of the additive. For clarity, if the bulk concentration of the discrete additive is 40% of the entire composition, the invention would anticipate surface concentrations of ≤34% discrete additive of the entire composition or ≥46% discrete additive of the entire composition, as 15% of 40% is 6%.

All molecular weights are weight average molecular weights determined by gel permeation chromatography unless stated otherwise. All references listed are incorporated herein by reference. Surface is defined as the sample volume within 20 micrometers of the surface of the thermoplastic article. For multilayer articles, interface is defined as the sample volume within 20 micrometers of the interface between one thermoplastic layer and a second layer. Bulk is defined as the region of the sample that is not within 20 micrometers of the surface of the thermoplastic article. For multilayer articles, bulk is defined as the region of the thermoplastic layer that is not within 20 micrometers of the interface between one thermoplastic layer and a second layer.

The invention will be generally described, and will also include an inorganic modified acrylic polymer system as a model system. One of ordinary skill in the art will recognize, based on the following description and examples, that other thermoplastics and other additives—organic or inorganic may be used with comparable results.

Matrix Polymer

The thermoplastic used as the matrix polymer in the compositions of the invention can be any thermoplastic or blends of multiple miscible thermoplastics, including miscible additives such as processing aids, stabilizers. Particularly preferred thermoplastics include, but are not limited to acrylic polymers, styrenic polymers, polyolefins, polyethylene terephthalate (PET), polybutylene terephthalate (PBT), polyvinyl chloride (PVC), polycarbonate (PC), polyurethane (PU), thermoplastic fluoropolymers, or mixtures thereof.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA.

Acrylic polymers, as used herein, include but are not limited to, homopolymers, copolymers and terpolymers comprising alkyl methacrylates. The alkyl methacrylate monomer is preferably methyl methacrylate, which may make up from 51 to 100 of the monomer mixture, preferably greater than 60 weight percent, more preferably greater than 75 weight percent, and most preferably greater than 85 weight percent. The remaining monomers used to form the polymer are chosen from other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more $C_{1-4}$ acrylates.

The thermoplastic polymers of the invention can be manufactured by any means known in the art, including emulsion polymerization, bulk polymerization, solution polymerization, and suspension polymerization. In one embodiment, the thermoplastic matrix has a weight average molecular weight of between 50,000 and 5,000,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

The level of the thermoplastic matrix polymer will be greater than 20 weight percent of the composition, preferably greater than 30 weight percent, more preferably greater than 40 weight percent and most preferably greater than 50 weight percent of the entire composition.

Discrete Additive Phase

The discrete additive phase may be any organic or inorganic material that is not miscible with the polymer matrix. In a preferred embodiment, the discrete additive phase is an impact modifier. Useful impact modifiers include block copolymers, graft copolymers, and core/shell impact modifiers that may optionally be refractive-index matched to the matrix polymer. In a preferred embodiment, the impact modifier comprises at least 50 weight percent of acrylic monomer units. The level of impact modifier can be adjusted to meet the toughness needs for the end use of the composition. Core-shell impact modifiers are multi-stage, sequentially-produced polymer having a core/shell particle structure of at least two layers. In one particularly preferred embodiment, the core-shell impact modifier has a soft (elastomeric) core, and a hard shell (greater than a Tg of 20° C.). Preferentially, the core-shell modifier comprises three layers made of a hard core layer, one or more intermediate elastomeric layers, and a hard shell layer. Preferably the impact modifier is a core-shell structure, in which the shell contains at least 50 weight percent of methyl methacrylate monomer units. In one embodiment, the core-shell impact modifier has a hard core (with a Tg greater than 30° C., and more preferably greater than 50° C.). In one embodiment, the core-shell impact modifier is made entirely of acrylic monomer units.

In another preferred embodiment, the discrete additive may include at least one mineral oxide or nano-mineral oxide. Useful mineral oxides or nano-mineral oxides include, but are not limited to silica, alumina, zinc oxide, barium oxide, molybdenum disulfide, boron nitride, tungsten disulfide and titanium oxide.

Nano-silica is especially preferred for this embodiment. Examples of useful silica materials include, but are not limited to, fumed silica, precipitated silica, silica fume, or silicas produced by sol-gel processes. The nano-silica at high loading does not need to be sized for good dispersion, though a sizing compatible with the thermoplastic polymer may be used. Useful sizing materials for compatibility with acrylic polymers include, but are not limited to Surface treatment compounds, referred to as "surface modifiers," may include but are not limited to diethyldichlorosilane, allylmethyldichlorosilane, methylphenyidichlorosilane, phenylethyldichlorosilane, octadecyldimethylchlorosilane, dimethyldichlorosilane, butyldimethylchlorosilane, hexamethylenedisilazane, trimethylchlorosilane, octyldimethylchlorositane, or a reactive group terminated organopolysiloxane.

Nano-zinc oxide is also especially preferred for this embodiment. The nano-zinc oxide at high loading does not need to be sized for good dispersion, though a sizing compatible with the thermoplastic polymer may be used.

In yet another preferred embodiment, a pigment is the discrete additive—where it may be preferred to increase pigment loading at the surface of a part but for property or cost or reasons have much lower pigment loading in the bulk.

Useful dyes and pigments of the invention include, but are not limited to: Cadmium zinc sulphide, CI Pigment Yellow 35, (CAS Reg. No. 8048-07-5, Reach No. 01-2119981639-18-0001), Cadmium sulphoselenide orange, CI Pigment Orange 20, (CAS Reg. No. 12656-57-4, Reach No. 01-2119981636-24-0001), Cadmium sulphoselenide red (CI Pigment Red 108, CAS Reg. No. 58339-34-7, Reach No. 01-2119981636-24-0001), Carbon Black (PBlk-7), TiO2 (PW-6), BaSO4 (PW-21 and PW-22), CaCO3 (PW-18), PbCO3, Pb(OH)2, (PW1), MACROLEX® Yellow 6G, MACROLEX® Yellow 3G, MACROLEX® Yellow G, MACROLEX® Yellow E2R, MACROLEX®, Yellow RN, MACROLEX® Orange 3G, MACROLEX® OrangeR, MACROLEX® Red E2G, MACROLEX® Red A MACROLEX® Red EG, MACROLEX® Red G, MACROLEX® Red H, MACROLEX® RedB, MACROLEX® Red 5B, MACROLEX® Red Violet, MACROLEX® Violet 3R, MACROLEX® Violet B, MACROLEX® Violet 3B, MACROLEX® Blue 3R, MACROLEX® Blue RR, MACROLEX® Blue 2B, MACROLEX® Green 5B, MACROLEX® Green G, MACROLEX® FluorescentYel., and MACROLEX®.

One very useful pigment is a nano-carbonaceous material. Nano-carbon was found to provide scratch resistance and/or thermal conductivity and/or electrical conductivity to the thermoplastic, but appears to have little effect on the gloss. Nano-carbon has also been used to increase electrical conductivity of the article. Useful carbonaceous compounds are nano carbons having a number average particle size of less than 500 nm, preferably less than 300 nm, more preferably less than 100 nm, and more preferably less than 50 nm. Carbon of larger size has poor dispersion in the thermoplastic. Carbonaceous materials useful in the invention include, but are not limited to carbon black, nano-graphite, thermally reduced graphite oxide, graphite flakes, expanded graphite, graphite nano-platelets, graphene, single-walled carbon nanotubes, multi-walled carbon nanotubes.

The discrete phase additive may also comprise one or more typical additives for polymer compositions used in usual effective amounts, including but not limited to, stabilizers, plasticizers, matting agents, fillers, coloring agents, immiscible polymers, antioxidants, antistatic agents, surfactants, toner, refractive index matching additives, adhesion promoters, additives with specific light diffraction, light absorbing, or light reflection characteristics, dispersing aids, radiation stabilizers such as poly(ethylene glycol), poly (propylene glycol), butyl lactate, and carboxylic acids such as lactic acid, oxalic acid, and acetic acid, light modification additives, such as polymeric or inorganic spherical particles with a particle size between 0.5 microns and 1,000 microns. The additives can be added into the composition prior to being added to the extruder, or may be added into the molten composition part way through the extruder.

In any of these embodiments, it may be preferred that at least some of the discrete additive further migrate to achieve a higher or lower concentration at the surface of a formed article or at least some of the discrete additive form even larger domains at the surface. One means to further these effects after the thermoplastic article is formed is to anneal the product at a temperature just below the melting point (crystalline polymers) or glass transition point of the matrix polymer for a period of time, in order to enhance or deplete the surface concentration by migrating the additive towards or away from the surface of an article. Annealing at a temperature just below the melting point (crystalline polymers) or glass transition point of the matrix polymer for a period of time is also a way to increase domain size due to additive migration. Slow cooling of an article formed by a heat process could also provide a surface with a higher or lower concentration of the additive than the bulk of the article. Similarly slow cooling of an article formed by heat process could also provide a way to increase domain size of the discrete additive.

It is also within the scope of the invention to chemically modify the surface energy of any additive by the use of certain chemical moieties with specific reactive or polar functionality (ie in core shell impact modifiers or block copolymers), chemical sizing, corona treatment or other surface modification of mineral oxides or pigments, to influence the migration of the discrete additive toward or away from a surface or interface. Alternatively, one could modify the surface energy of the thermoplastic matrix to influence the additive migration toward a surface or interface. The thermoplastic could be modified by known means, such as the choice of comonomers, of a post-polymerization grafting or functionalization. Similarly, changes to additive or matrix surface energy could increase domain sizes of the additives.

It is also anticipated that the rheology of either the matrix polymer or the discrete additive may be altered to influence the migration of the discrete additive toward or away from a surface or interface. This may be accomplished by any means known in the art including changes in molecular weight, polymer branching, additive size, or addition of reactive or polar chemical functionality. Similarly, the rheology of either matrix or discrete additive may be altered to increase domain sizes of the additive.

In any embodiment, the discrete additive may be a combination of the one or more of the additives listed above or any others used to modify the properties of a thermoplastic polymer. It is within the scope of the invention the same process may cause enhancement of one type of additive but depletion of a $2^{nd}$ type, while also possible having limited distribution effect on a $3^{rd}$ type, while also increasing domain size of a $4^{th}$ additive.

The total level of the discrete additive in the composition is less than 80 weight percent, less than 65 weight percent, and preferably less than 50 weight percent. In certain cases, additive levels of less than 10 weight percent, even less than 5 weight percent and possibly even less than 1 weight percent may be very useful in thermoplastic compositions.

Process of Forming Thermoplastic Article

The process for forming the thermoplastic article having a continuous polymeric phase (matrix) and a discontinuous discrete phase (additive) distributed within the continuous phase where the surface concentration of the discrete additive varies from the bulk concentration by at least 15 volume percent is by polymer melt processing. While any polymer melt process known in the art may be used, particularly useful heat processing methods include, but are not limited to injection molding, extrusion and coextrusion, film extrusion, blow molding, lamination, extrusion lamination, rotomolding, and compression molding. The articles or plaques can be monolithic or multi-layered. Injection molding or compression molding of these materials utilizing inductively heated surfaces (one example is commercially known as RocTool® as described in U.S. Pat. No. 7,419,631 BB, U.S. Pat. No. 7,679,036 BB, EP2694277 B1) on one or both surfaces of the mold may allow for increased surface enhancement of depletion of the continuous phase. Inductive heating of one surface of a mold or die may also be considered for extrusion, coextrusion, blow molding, or roto-molding.

The process for forming the thermoplastic article having a continuous polymeric phase (matrix) and a discontinuous discrete phase (additive) where the additive is associated into domains. The number average size of the domains in the thermoplastic article surface is at least 2× the number average size of the domains in the thermoplastic article bulk. While any polymer melt process known in the art may be used, particularly useful heat processing methods include, but are not limited to injection molding, extrusion and coextrusion, film extrusion, blow molding, lamination, extrusion lamination, rotomolding, and compression molding. The articles or plaques can be monolithic or multi-layered. Injection molding or compression molding of these materials utilizing inductively heated surfaces (one example is commercially known as RocTool® as described in U.S. Pat. No. 7,419,631 BB, U.S. Pat. No. 7,679,036 BB, EP2694277 B1) on one or both surfaces of the mold may allow for increased surface enhancement of depletion of the continuous phase. Inductive heating of one surface of a mold or die may also be considered for extrusion, coextrusion, blow molding, or roto-molding.

Other additives, and the optional pigments and dyes can be dry blended into the composition prior to heat processing into the final article. In the case of some additives, such as the pigment or dye, a masterbatch containing a concentrate could be used.

Additionally, the injection molding process for forming the thermoplastic article having a continuous polymeric phase (matrix) and a discontinuous discrete phase (additive) distributed within the continuous phase where the surface concentration of the discrete additive is at least 0.5 volume percent greater than or less than the concentration of discrete additive in the bulk. The injection molding conditions have been found to effect the distribution of the additive in the molded part. For example, previous authors found that in the case of polyethylene-carbon black composites, injection molding produces an anisotropic distribution of carbon black particles where the "skin" layer is substantially depleted of carbon black due to flow induced segregation. The present invention describes an injection molding process for forming a thermoplastic article without a "skin" layer, where the concentration of additive in the article surface is within 0.5 volume percent, plus or minus, the concentration of additive in the article bulk Three references that describe flow induced segregation of carbon black:
1: Bayer, R. K.; Wiegel, P. et al., J Mater Sci 1988, 23, 475-480.
2. Ezquerra, T. A.; H. G.; Balta Calleja, F. J., et. al., J Mater Sci 1988, 23, 4121-4126.
3. Martizen Salazar, J.; Balta Calleja, F. J., et. al., Colloid Polym Sci 1989, 267, 409-113.

Multi-Layer Articles

Multi-layer articles are also contemplated by the invention where one or both layers contains the heterogeneous distribution of the additive between the bulk of the layer and the surface of the layer or between the bulk of the layer and the interface with the $2^{nd}$ layer. The enhanced distribution of adhesion promoters at the interface of a multilayer article may be particularly useful. The multi-layer article could be two layers, or multiple layers, that could include adhesive and/or tie layers. Substrates contemplated for use in the multi-layer article include, but are not limited to thermoplastics, thermoset polymers, wood, metal, masonry, wovens, non-wovens.

Multi-layer articles where one or both layers contain discrete additives that form domains are also contemplated by the invention. One or both layers would have a surface and/or interface layer where the number average size of the domains in the thermoplastic layer surface and/or interface layer is at least 2× the number average size of the domains in the thermoplastic article bulk region. The multi-layer article could be two layers, or multiple layers, that could include adhesive and/or tie layers. Substrates contemplated for use in the multi-layer article include, but are not limited to thermoplastics, thermoset polymers, wood, metal, masonry, wovens, non-wovens.

The multi-layer articles can be formed by means known in the art, including, but not limited to: coextrusion, co-injection molding, two shot injection molding, insert molding, extrusion lamination, compression molding, lamination.

In one embodiment, the multi-layer article has an outer layer and an inner layer, where the outer layer has a thickness of from 0.1 to 10 mm, and said inner layer has a thickness of from 0.1 to 250 mm.

Properties

The composition of the invention, when heat processed to form an article or test sample with enhancement or depletion of a discrete additive may provide a unique combination of properties that are useful in several applications.

For example, where the concentration of a mineral oxide is increased at the surface, scratch and/or mar resistance is increased while maintaining the ductility of the material—similar to if less (or no) impact modifier is utilized. This has advantages in uses such as automotive trim, where mar resistance is required at the surface, but ductility is needed for "snap fitting" to attach the part to an automobile.

As a second example, in the embodiment where nano-carbon domain size is maintained at the surface of the material, enhanced electrical surface conductivity is achieved at lower overall concentrations. Lower total bulk concentrations leads to advantages in bulk mechanical toughness and cost. This embodiment may be of particular use in application where anti-static properties are required—such as electronic equipment.

Uses

The composition of the invention is for many applications, including but not limited to building and construction (such as decking, railings, siding, fencing, and window and door profiles); automotive applications (such as exterior trim, interiors, mirror housings, fenders); electronics (such as ear buds, cell phone cases, computer housings); custom sheet applications especially as a capstock; electronic equipment, electronic housing and packaging and outdoor equipment (such as snow mobiles, recreational vehicles, jet skis).

EXAMPLES

Example 1

Polymethyl methacrylate resin, PLEXIGLAS V-825 from Arkema, would be melt compounded in a twin screw extruder with 10 weight percent fumed silica, such as TS622 from Cabot. The final blend would be injection molded into parts or test specimens using the commercially available RocTool induction mold technology, where top and bottom surface of the article would be inductively heated to temperature of greater than 100° C. The resulting part would have a silica concentration of greater than 7 volume percent within 20 microns of the surfaces, but <5 volume percent in the bulk of the material. A volume weight percent of 7 percent is about the same as a 15 weight percent change.

Comparatively if the part is molded with conventional injection molding (mold surface temperatures <100° C.), the bulk and surface concentration of the silica would all be <5 volume percent.

Mar testing would also be conducted on the samples. Samples would be tested using a Crockmeter (SDL-Atlas model M238BB) using 3M polishing paper (part #3M281Q). It would be observed that the samples molded with Roctool using inductive heating on the surface of the molds with >7 volume percent silica at the surface are essentially unchanged in appearance when tested for 200 rubbing cycles, while samples molded with traditional means, having <5 volume percent, show extensive marring and surface roughening.

An alternative way to achieve >7 volume percent of silica at the surface of the material would be to utilize 15 weight percent fumed silica in the overall formulation. However, this may not be desirable due to difficulty of incorporating higher levels of silica into a melt stream during compounding, loss in bulk ductility of the material and higher cost.

Example 2

Polymethyl methacrylate resin, PLEXIGLAS V-825 from Arkema, would be melt compounded in a twin screw extruder with 10 volume percent conductive carbon black, such as Ketjenblack EC-600JD from AkzoNobel. The final blend would be injection molded into parts or test specimens using the commercially available RocTool induction mold technology, where top and bottom surface of the article would be inductively heated to temperature of >100° C. The resulting part would have a carbon black concentration of greater than 9.5 volume percent within 20 microns of the surface of the test specimen.

Comparatively if the part is molded with conventional injection molding (mold surface temperatures <100° C.), the surface concentration of the carbon black would be less than 9.5 volume percent.

Volume resistivity measurements would also be conducted on the samples. The volume resistivity would be measured at room temperature using a standard two-terminal DC resistor, in both the through-thickness resistivity and surface resistivity configurations. It would be observed that the volume resistivity and surface resistivity of the part molded with commercially available RocTool induction mold technology would decrease by at least 15% compared to the part molded with conventional injection molding.

What is claimed is:

1. A thermoplastic article having a continuous polymeric phase (matrix) and a discontinuous discrete phase additive distributed within the continuous phase where the surface concentration in at least one surface of the discrete additive is greater or less than the bulk concentration by at least 15 volume percent of the concentration of the additive, wherein said thermoplastic article has a thickness of greater than or equal to 0.1 mm, and wherein the surface layer is defined as the sample volume within 20 micrometers of the surface of the thermoplastic article.

2. The thermoplastic article of claim 1, wherein said matrix is selected from the group consisting of acrylic polymers, styrenic polymers, acrylonitrile-butadiene-styrene (ABS) copolymers, acrylonitrile-styrene-acrylate (ASA) copolymers, styrene acrylonitrile (SAN) copolymers, polyolefins, polyvinyl chloride (PVC), polycarbonate (PC), polyurethane (PU), polyamides (PA), polypropylene oxide (PPO), polyesters, thermoplastic fluoropolymers or mixtures thereof.

3. The thermoplastic article of claim 1 wherein said discrete phase additive comprises an impact modifier, selected from the group consisting of block copolymers, graft copolymers, and core/shell impact modifiers.

4. The thermoplastic article of claim 1 where said discrete phase additive comprises a mineral oxide or nano-mineral oxide.

5. The thermoplastic article of claim 1 where said discrete phase additive comprises a pigment, a thermally conductive additive, or electrically conductive additive selected from the group consisting of carbon black, nano-carbon, graphite oxide, reduced graphite oxide, graphene, nanographite, and graphite nanoplatelet.

6. The thermoplastic article of claim 1 where said discrete phase additive comprises a cross-linked acrylic bead, cross-linked polyorganosilicone rubber, or polymethylsilsesquioxane.

7. A melt process for forming the thermoplastic article of claim 1, wherein said process comprises blending said continuous phase and discontinuous discrete phase in the melt and contacting said melt blend with at least one heated die or mold.

8. The process of claim 7 where one or more sides of the mold or die are inductively heated.

9. A multi-layer article wherein a layer comprises a thermoplastic layer having a continuous polymeric phase and a discontinuous discrete additive phase distributed within the continuous phase where the surface and/or interface distribution of the discrete additive varies from the bulk distribution by at least 15 volume percent of the concentration of the additive wherein said thermoplastic article has a thickness of greater than or equal to 0.1 mm, and wherein the surface layer is defined as the sample volume within 20 micrometers of the surface of the thermoplastic article.

* * * * *